US010983478B2

(12) United States Patent
Cheng et al.

(10) Patent No.: US 10,983,478 B2
(45) Date of Patent: Apr. 20, 2021

(54) COMPLEX DEFECT DIFFRACTION MODEL AND METHOD FOR DEFECT INSPECTION OF TRANSPARENT SUBSTRATE

(71) Applicant: National Taiwan Normal University, Taipei (TW)

(72) Inventors: Chau-Jern Cheng, Taipei (TW); Han-Yen Tu, Taipei (TW); Kuang-Che Chang Chien, New Taipei (TW); Yu-Chih Lin, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 0 days.

(21) Appl. No.: 16/360,788

(22) Filed: Mar. 21, 2019

(65) Prior Publication Data

US 2019/0294106 A1     Sep. 26, 2019

(30) Foreign Application Priority Data

Mar. 22, 2018   (TW) .................. 107109876

(51) Int. Cl.
*G03H 1/00*     (2006.01)
*G03H 1/04*     (2006.01)
*G01N 21/958*   (2006.01)

(52) U.S. Cl.
CPC ......... *G03H 1/0443* (2013.01); *G01N 21/958* (2013.01); *G03H 1/0005* (2013.01); *G03H 1/0465* (2013.01); *G03H 2001/005* (2013.01); *G03H 2001/0445* (2013.01); *G03H 2001/0452* (2013.01)

(58) Field of Classification Search
None
See application file for complete search history.

(56) References Cited

U.S. PATENT DOCUMENTS

2016/0275369 A1*  9/2016  Caviedes ............... G06F 16/51
2018/0156597 A1*  6/2018  Smith ............... G01B 9/02043

FOREIGN PATENT DOCUMENTS

| CN | 101241086 A | 8/2008 |
| CN | 101750422 A | 6/2010 |
| CN | 102305798 A | 1/2012 |
| TW | I512284 B | 12/2015 |

* cited by examiner

*Primary Examiner* — Mikhail Itskovich
(74) *Attorney, Agent, or Firm* — Muncy, Geissler, Olds & Lowe, P.C.

(57) ABSTRACT

A method for defect inspection of a transparent substrate comprises utilizing a wavefront reconstruction unit to obtain complex defect diffraction wavefront of a transparent substrate; using a complex defect diffraction module to confirm the effective diffraction distance of the complex defect diffraction wavefront; utilizing a defect detection module to detect position of the defect of the transparent substrate; using a defect classification module to perform extraction, analysis and classification of diffraction characteristics and utilizing a machine learning algorithm or a deep learning algorithm to automatically identify the defects.

18 Claims, 19 Drawing Sheets

COMPLEX DEFECT DIFFRACTION MODEL AND METHOD FOR DEFECT INSPECTION OF TRANSPARENT SUBSTRATE

TECHNICAL FIELD

The present invention relates to defect inspection of a transparent substrate, and more particularly, to a complex defect diffraction model and method for defect inspection of a transparent substrate.

BACKGROUND

Glass substrate is one of the most popular and widely components applied for all kinds of optoelectronic products, such as photoelectric display, intelligent mobile phone panel, micro lens and so on. There are a lot of requirements and applications of glass substrate in the field of optoelectronic industry. Especially, in manufacturing and assembling of photovoltaic products including photoelectric display (for example: liquid crystal display, plasma display panel, organic light emitting diode), digital camera, intelligent mobile phone panel, the glass substrate plays a very significant and key role. In addition, in bonding with silicon chip, microelectromechanical systems (MEMS), Bio-medical, micro mirror, micro glass-block, polarized beam splitter, and dichroic filter, all kinds of glass substrates are also used.

Furthermore, in the high-tech industries, such as the semiconductor manufacturing process, precision machinery and display devices, all of them are tendency to miniaturization, precision, and nanometer level. Therefore, in the development of measurement equipment, manufacturing technology, and integrated technology in the field of precision machinery, the defect detection technology of glass substrate is very important.

Please refer to China patent application No. CNI01241086, it discloses "a detecting apparatus based-on detecting bubble, impurity of glass substrate"; the other, China patent application No. CNI01750422, it discloses "an on-line automatic detection device of defects on glass"; and, China No. CNI02305798, it discloses "detection and classification method of defects on glass based-on machine vision". However, in the disclosure of the above-mentioned patent applications, method of detection and classification of defects on glass only performs edge detection for the image to obtain edge information of the defects. Such methods are not suitable for detection of micro bubble defects on glass, and the micro bubble detection system or device is still needed to be further improved for facilitating detection of the defects.

In addition, please refer to the R.O.C. Patent No. I512284 entitled "defect detection system for bubble on glass", which utilizes a diffused light irradiating to a piece of glass substrate to be detected, to obtain an illumination image of glass substrate, and utilizes binarization threshold for searching a bubble image in the region of interest, to achieve the purpose of improving test accuracy. However, this method utilizes extraction of intensity image information, combining with image processing and retrieval comparison of database, to determine the location of defects and type of glass substrate.

In practice, the most transparent glass substrate is still utilizing manual or semi mechanical operation mode to obtain reflection or penetrating pattern of glass substrate to identify the possible defects. Some methods are utilizing machine vision to use camera for shooting reflection or penetration pattern of the glass substrate, and further performing some defect image algorithms to complete the detection. However, through the machine vision camera, only the intensity image can be obtained, and the complex images information of the glass substrate can't be obtained completely. Furthermore, it is easy to lose focus or without focusing because the camera can't effectively focus on transparent substrate. Therefore, it is often necessary to carry out a complicated and time-consuming algorithm for multiple pre-signal processing and classification to proceed the following detection task. Thus, the existing machine vision can't provide quickly and effectively detect the transparent substrate and improve yield of detection due to the above complicated operations. That is to say, through machine vision, two-dimensional imaging is not easy and the calculation of image intensity is complex; three-dimensional imaging is time-consuming, and image intensity is dealt with only on a single plane.

In view of a rapid evolution in nano and micron technology, the production of many industries has trend of miniaturization manufacture and applications. The integrated circuits and semiconductor components, and micro optic elements are essential components of the technology products. In recent years, the demand and use of smart phones and display panel products are the most significant influenced by the rapid spread of social media and Internet information. Therefore, in the face of rapid production demand, how to effectively improve the yield of process and product has become an important indicator of business operation cost.

Defects detection items of micro optics include: surface defect detection, surface roughness, surface profile, film thickness and roughness, curvature radius, wavefront measurement, aberration analysis, refractive index distribution etc. At present, there are some defects detection technologies, such as metallographic microscope, confocal microscope, atomic force microscope and white light interferometer. The different defect types of detection techniques require the use of mechanical scanning and image stitching and other related technologies, to complete wide field reconstructed image with high resolution of a large area. This leads to time-consuming of defect detection process, so that only some samples can be extracted to shorten the detection time. Therefore, how to effectively implement the detection of transparent substrate to improve resolution and field of view, and shorten the detecting time and improve the detection area, has become an important issue in the industry and field of detection. Therefore, how to improve the field of view and high resolution imaging mechanism to shorten the detection time and increase the number of detection has become an important issue in the current defect detection.

Furthermore, defect detection technology of the traditional industrial products is often not suitable for the penetrating detection of transparent glass substrate. Therefore, how to effectively detect transparent substrate, improve the resolution and visual field of measurement, shorten the detection time and improve the on-site detection quantity has become important topics for the existing domestic and foreign industries and detection fields.

In recent years, digital holography has played an important role in quantitative phase imaging (QPI) due to its advantages of wavefront measurement and quantitative analysis. The concept of coaxial mirror-free digital holography was proposed by Professor Ichirou Yamaguchi of Japan in Applied Optics in 2001 which provides a digital hologram architecture by using a mirror-free reference spherical light-wave, but the information of DC and conjugate terms need to be filtered by time-consuming recursive algorithm. Therefore, Professor Aydogan Ozcan of UCLA proposed a pixel super-resolution approach combining with synthetic aperture (SA) in Light Science & Applications in 2015 to achieve a spatial super-resolution, and to improve the limitation of inadequate sampling points of image sensor by a recursive algorithm. However, such a high-resolution imaging mechanism needs to take hundreds of holographic images and place samples on the image sensor to record holographic information in order to achieve high-resolution. Then, time-consuming methods of recursive operations are used to obtain hyper-resolution reconstructed images. Such imaging limitations and time-consuming computational methods are not suitable for defect detection on production lines.

The defects of the transparent substrate may lead to serious yield decline of the whole product process and assembly, and greatly increase the cost of production and waste of resources. Therefore, it is very important for defect detection of the transparent substrate in the manufacturing and assembling processes of the photoelectric products.

In view of the shortcomings of the above-mentioned technologies, there is no effective and reliable transparent substrate defect detection technology and method available for industrial detection and application in the market at present. It is necessary to develop a novel method to detect the defects of transparent substrate to solve and overcome the above problems.

SUMMARY OF THE INVENTION

The present invention proposes a wide field digital holography system for wavefront reconstruction, in which up sampling technique and spherical reference light wave can be used to solve the problem of insufficient resolution of image sensor pixels and overlap of frequency bandwidth between DC (direct current) term and interference item in wide field imaging system, which causes high frequency information not easily obtained. It is also applied to defect detection of transparent glass substrate, including: bubble, dust, watermark, scratch and other defects, while building a database for rapid comparative analysis.

The invention utilizes a wide field digital holographic micrography technology to effectively record the diffraction characteristics of bubble, dust, watermark, scratch and other defects and contaminations on a transparent glass substrate, and quantifies and analyses the diffraction characteristics through a machine learning algorithm of defect detection, and detects and classifies the defects to achieve the detection of the transparent glass substrate.

The invention proposes a defect inspection system suitable for the transparent glass substrate, solves the problem of insufficient resolution of pixels in traditional wide field measurement system, and uses quantitative wavefront measurement analysis method to judge the defect type and locate its distribution in three-dimensional space.

In order to effectively analyze the defect diffraction characteristics of complex images recorded by wide field digital holographic micrography, the present invention proposes a complex defect diffraction module to determine the effective analysis range of the diffraction characteristics through the far field diffraction distance, and at the same time, determine the difference of the diffraction fields between the two reconstruction distances through the longitudinal focal depth of the diffraction field, in order to define minimum effective reconstruction interval and maximum diffraction distance in the longitudinal direction based-on the defect diffraction characteristics.

In this invention, a method for defect inspection of a transparent substrate comprises utilizing a wavefront reconstruction unit to obtain defect complex optical field of a transparent substrate; utilizing a defect diffraction module to confirm an effective diffraction range of the defect complex light field; utilizing a defect inspection module to detect a location of a defect on the transparent substrate; and utilizing a defect classification module to analyze and classify diffraction characteristics of the defect complex light field.

The defect classification module is further to identify a type of the defect.

According to one aspect, the method further comprises utilizing the defect diffraction module to obtain minimum effective reconstruction interval and maximum diffraction distance of two adjacent diffraction planes. A defect complex image is reconstructed at different longitudinal positions can be obtained based-on the minimum effective reconstruction interval and the maximum diffraction distance.

According to another aspect, the method further comprises utilizing a digital holographic microscopy to obtain a defect complex image of the transparent substrate. The method further comprises a numerical propagation of Fourier transform approach, convolution approach, angular spectrum approach or Fresnel diffraction transform approach to reconstruct defect complex images of the transparent substrate.

According to yet another aspect, the transparent substrate is for example glass substrate, sapphire substrate, transparent ceramic substrate, transparent polymer substrate, such as polycarbonate (PC) substrate, Polymethylmethacrylate (PMMA) substrate or high transmittance optical substrate. The transparent substrate includes a Polyester (PET) film or a transparent film.

According to one aspect, the method further comprises utilizing an automatically focusing algorithm to determine a location of said defect on said transparent substrate. The automatically focusing algorithm is performed in the defect inspection module.

The method further comprises a machine learning algorithm or a deep learning algorithm in the defect classification module to automatically identify the defect.

According to one aspect, the machine learning algorithm includes a region-based segmentation algorithm and a morphology operation. The machine learning algorithm includes a feature extraction process and a classification model.

The method further comprises providing a defect complex images database for the machine learning algorithm. The machine learning algorithm includes at least one convolutional neural network and at least one classifier.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Figure 1:
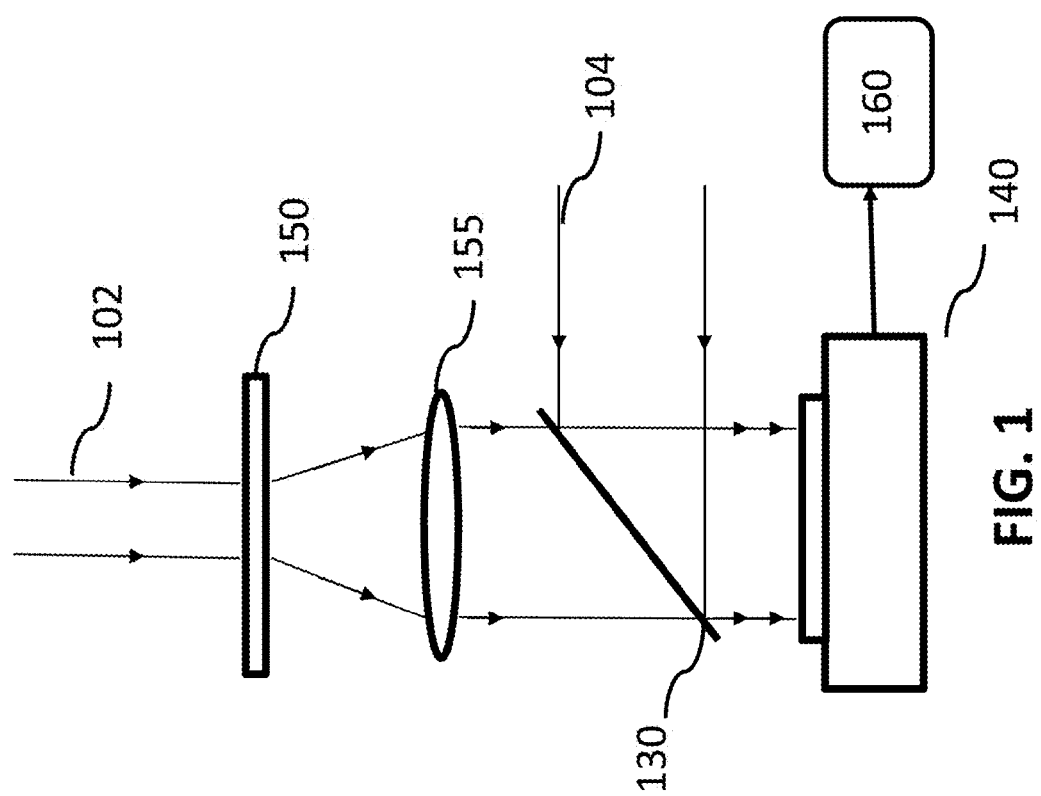
FIG. 1 illustrates a schematic diagram of a digital holographic microscopy of an apparatus of defect inspection of a transparent substrate according to one embodiment of the invention.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The proposed digital holography recording method is applied to obtain and record wavefront information of defects on a transparent substrate. Based on this wavefront information, the diffraction fields of defects on different planes are identified and classified through the proposed defect diffraction model. The method of identification and classification is to automatically analyze the wavefront and diffraction characteristics of the defects through computer learning, in order to achieve automatic identification and classification of the defects on the transparent substrate. In the embodiment, the defects such as bubble, dust, scratch and watermark the on transparent substrates can be distinguished by the proposed method of the invention.

In order to meet the above technical requirements, the invention provides an apparatus of a defect inspection of a transparent substrate. The apparatus comprises at least the following components:

(1) Digital holographic recording and reconstruction unit: Record light field information of the substrate to be detected by digital holographic technology, and use the reconstructed amplitude and phase to analyze and identify the defect information of the substrate.

(2) Defect Diffraction Module: It is used to analyze the defect to create different results of diffraction in space, define the effective range of diffraction distance for analysis and the number of effective observations within the range; through the size of the defect, determine the effective range of diffraction distance through diffraction distance of far field, and determine the difference of diffraction field between two distances through the longitudinal focal depth of the diffraction field to define the number of effective observations within the range.

(3) Defect Inspection Algorithms of Machine Learning or Deep Learning: They are used to quantify the diffraction characteristics recorded by complex images of the defect on a glass substrate. Using the proposed defect diffraction module, the diffraction characteristics of three-dimensional space in different positions are reconstructed at effective longitudinal intervals and distances. Through the proposed algorithm, the inter-relation between amplitude and phase values between the same reconstructed plane and different reconstructed planes is extracted and quantified to analyze the diffraction characteristics of normal glass substrates and various defects, and further to use the computer to analyze the diffraction characteristics of normal glass substrate and various defects. Machine Learning or Deep Learning is used to detect defects and identify different defects.

The invention provides a method for defect inspection of a transparent substrate, which includes: a wavefront reconstruction algorithm; using a defect diffraction module to define the defect to be identified, the effective diffraction range required in the identification process, and the number of effective diffraction observations in the range; and using a defect inspection algorithm based on the diffraction characteristics, which can automatically detect the location of defects on the glass substrate, in the defect diffraction module; and using a defect identification algorithm based on diffraction characteristics to extract and analyze the diffraction features for the detected defect areas and identify the types of defects, in the defect diffraction module.

FIG. 1 shows a schematic diagram of a digital holographic microscopy of an apparatus of defect inspection of a transparent substrate according to one embodiment of the invention. The process of digital holographic microscopy: an incident light 102 is incident to a transparent substrate 150, and passes through an object lens 155; then, a reference light 104 interferes with the incident light in a beam splitter 130; finally, a light detector array 140 is used to generate a defect complex light field of the transparent substrate. Then, a wavefront reconstruction unit 160 is used to reconstruct the defect complex light field. The form of incident light 102 includes line light source, plane light source or spherical light source.

Figure 2:
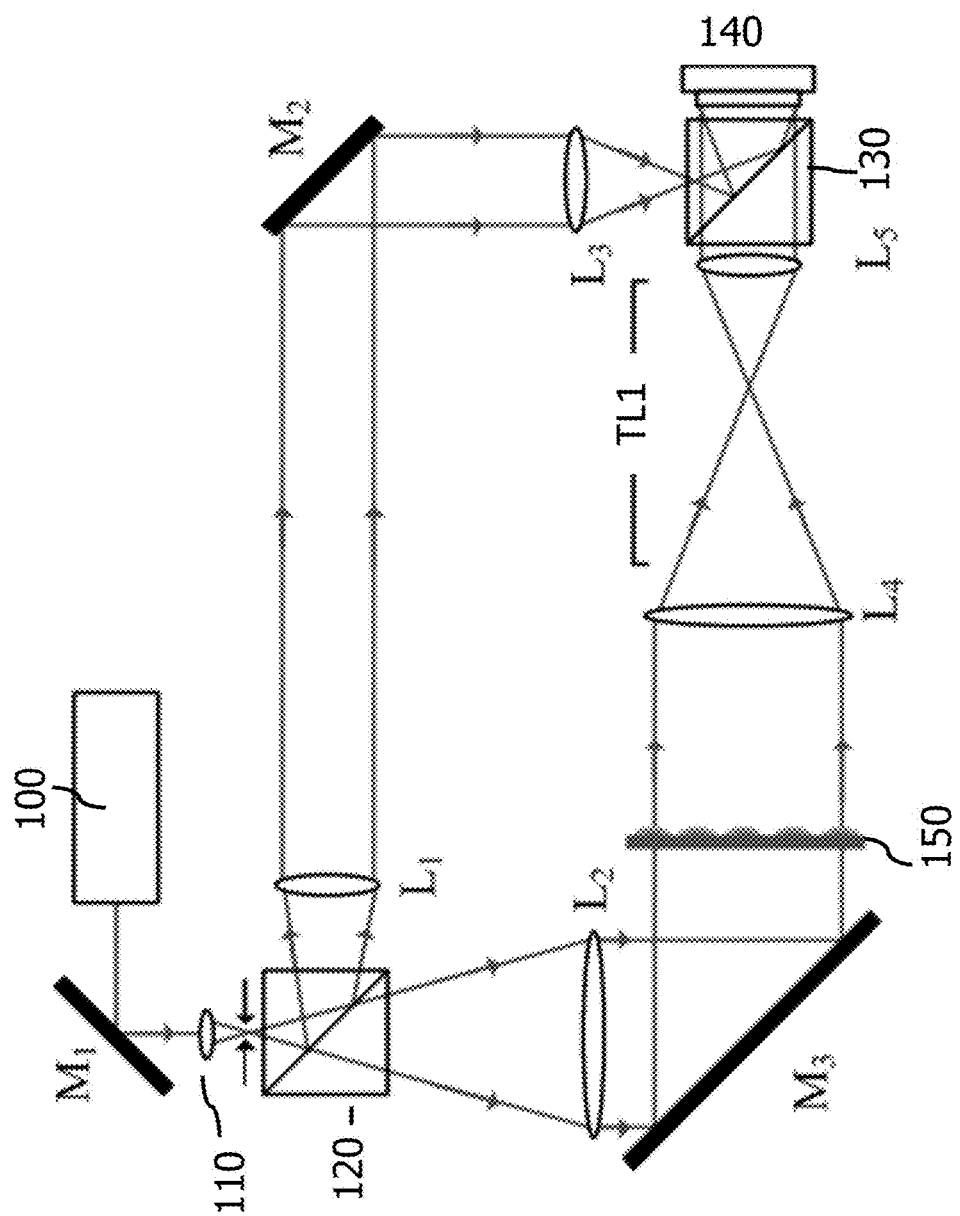
FIG. 2 illustrates a schematic perspective view showing an off-axis optical system by plane wave illumination of a defect inspection apparatus of a transparent substrate according to an embodiment of the invention.

As shown in FIG. 2, it shows an optical system of a defect inspection apparatus of a transparent substrate according to one embodiment of the present invention. This embodiment is applicable for processing hologram associated with at least one resolution standard sample and a transparent substrate. The hologram can be generated by the optical system of this embodiment. In the embodiment of the FIG.

2, it provides an off-axis optical system by wide field of view, plane wave illumination. The optical system includes a light source 100, a beam expander (BE) 110, two beam splitters 120 and 130, a photodetector array 140 (for example: Charge-coupled device (CCD), Complementary Metal-Oxide-Semiconductor (CMOS) image sensor, photodetector), and five lenses L1~L5 and three mirrors M1~M3. The light source 100 includes a vertical-cavity surface-emitting laser (VCSEL), a semiconductor laser, a solid-state laser, a gas laser, a dye laser, a fiber laser or light emitting diodes (LED). The emission type of the light source 100 comprises a line light source, a planar light source or a spherical light source. The light source 100 includes coherent light source, low coherent light source or incoherent light source. The optical system includes an optical image resizing/reduction system (Telescopic Imaging System) TL1, which includes a lens L4 with 0.5 magnification ($M_{TL}=0.5\times$) and focal length of 100 mm (millimeter) and a lens L5 with focal length of 50 mm. The front and rear focal length of the lens L4 can be equal or substantially equal (with a slight difference), and the front and rear focal length of the lens L5 can be equal or substantially equal (with a slight difference). The lens L3 also has a focal length of 50 mm located at reference wave terminal for spherical reference wave passing through, and the front and rear focal length of the lens L3 can be equal, or substantially equal (with a slight difference). The optical path of the optical system of the apparatus of defect inspection of the transparent substrate includes: a diode laser 100 emits a laser beam with center wavelength of 405 nm (nanometer), the laser beam reflecting by the mirror M1 and passing through the beam expander 110 to generate an expanded beam, then incident into the beam splitter 120 to output two beams respectively, followed by passing through the lens L1 with diameter 2 inch and the lens L2 with diameter 1 inch respectively to form a collimated plane wave with beam diameter of 2 inch and beam diameter of 1 inch. One beam of the two beams is passing through the object on the transparent substrate 150 to be measured to form an object wave after reflecting by the mirror M3, and the object wave is passing through the Telescopic Imaging System (lens L4 and lens L5) TL1 for image reduction as wide field object wave, and passing through the beam splitter 130 and then projecting to (including imaging or non-imaging mode) the photodetector array 140. The other beam of the two beams is reflected by the mirror M2 as the reference wave, followed by passing through the lens L3 to form spherical reference wave of numerical amplification $M_S=2$, and passing through the beam splitter 130 and then incident to the photodetector array 140. And, the reference wave maintains off-axis angle with the object wave to perform Off-Axis digital holographic recording, in order to ensure that DC term and conjugation term of the off-axis recording can be eliminated based-on the reference wave. The above three mirrors M1~M3 are only used to redirect the optical path of the laser beam. The lens L2 can be regarded as the element which can generate the beam expanding wavefront (plane wave and spherical wave). The lens L3 can be regarded as the element which can generate a planar, a spherical and an arbitrary curved surface wavefront.

In one embodiment, the mirror M3 is equipped with a piezoelectric transducers (PZT), spatial light modulator (SLM), or rotatable parallel plate, which may be as a phase shifter for adjusting phase shift of the reference wave.

In one embodiment, the optical system further comprises a filter mask configured between the two lens of the Telescopic Imaging System TL1. The filter mask comprises a first filter area and a second filter area, wherein the first filter area allows the object wave passing through and the second filter area allows the reference wave passing through.

In one embodiment, the optical system further comprises an intermediate optics system TL2 and a grating, wherein the grating is configured between the TL1 and the TL2, and the filter mask is configured between the two lens of the intermediate optics system TL2. In one embodiment, the intermediate optics system TL2 is an optical image resizing/reduction system (Telescopic Imaging System).

It should be noted that the optical system of FIG. 2 utilizes an improved Mach-Zehnder interferometer to implement off-axis digital hologram to generate wide field holograms. In another embodiment, the holograms may be utilized by mechanically moving photodetector array, the measured object and incident beam for expanding wide field to generate digital hologram of on-axis, off-axis, in-line, common-path, on-axis common-path or off-axis common-path optical scheme.

Figure 3:
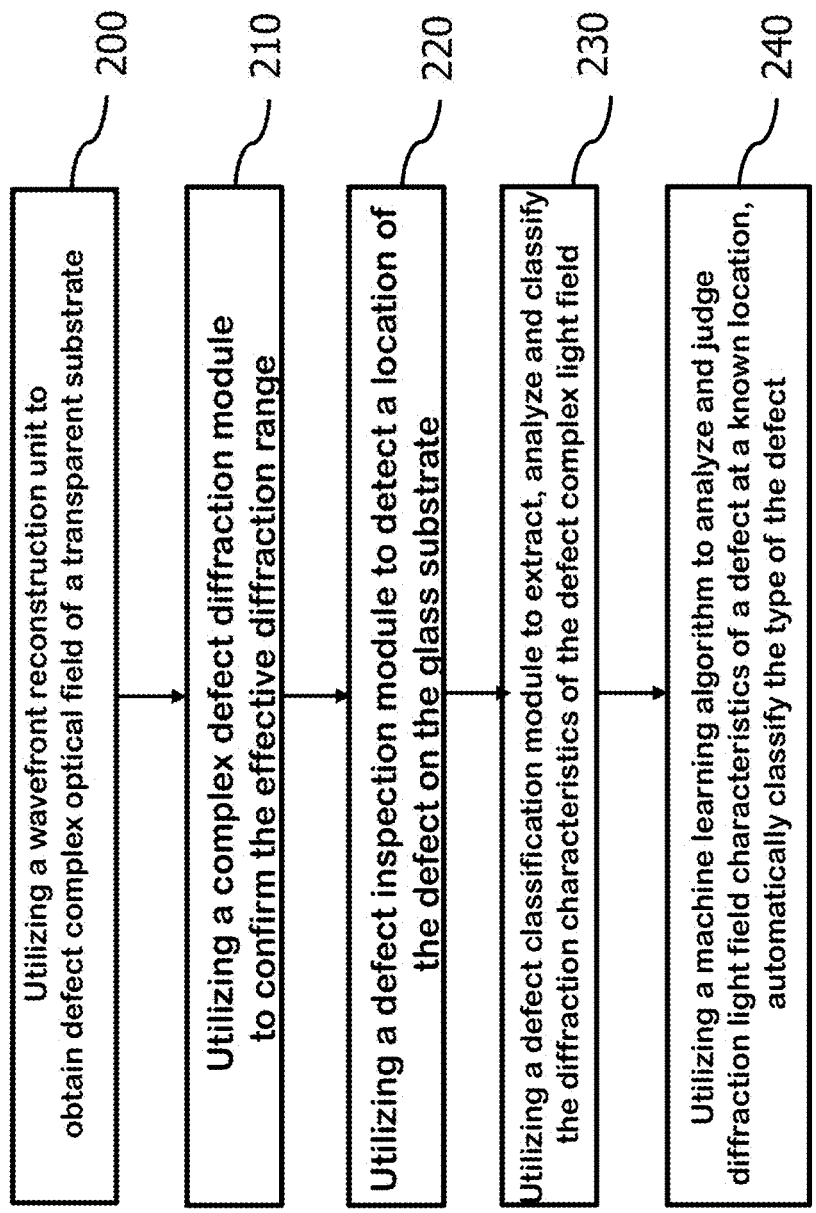
FIG. 3 illustrates a flow chart of defect inspection method for the defect complex optical field diffraction model of a transparent substrate according to one embodiment of the present invention.

FIG. 3 shows a flow chart of defect inspection method for the defect complex optical field diffraction model of a transparent substrate according to one embodiment of the present invention. The defect inspection method of the transparent substrate of the invention is performed to process the defect complex image of the transparent substrate by a defect inspection apparatus of the transparent substrate. The method for defect inspection of the transparent substrate includes steps 200 to 240. Firstly, in the step 200, the defect complex optical field of a transparent substrate is obtained by using a wavefront reconstruction unit or a wavefront sensing device. In this step 200, digital holographic microscopy is used in the wavefront reconstruction unit or wavefront sensing device to obtain defect complex images of the transparent substrate. The wavefront reconstruction unit comprises at least one computing device. In this embodiment, a wide field digital hologram micrography technique is used to obtain a field of view with more than one inch by means of an optical image reduction system or a beam shrunk lens set, as shown in FIG. 1, and the lateral resolution with several microns is obtained by means of a sampling procedure of digital hologram. In other words, the system can make a shooting record for the transparent glass substrate to obtain the amplitude and phase complex images of the defects in the transparent glass substrate. For example, the processes to obtain the defect complex optical field of the transparent substrate are as follows. First, using the optical system of the defect inspection apparatus for the transparent substrate, the object light wave to be measured is diffracted via the transparent substrate, and then the diffracted object light wave is interfered with the reference light wave, which is used as the wavefront recording and reconstruction of the wide-field hologram image to obtain the defect complex images of the transparent substrate to be measured. The wavefront of the hologram image can be recorded through a digital hologram access unit. The wavefront of holographic image can be reconstructed by a digital holographic reconstruction method. For example, the diffraction of the object wave is geometric imaging, Fresnel diffraction or Fraunhofer diffraction. It can solve the problem that high frequency information of the object to be measured can't be effectively analyzed due to actual pixel size limit of the photodetector array. In this embodiment, when considering the optical field distribution of plane wave incident to the object to be measured, the diffraction information will be image reduction by the optical image reduction system to achieve wide field image output; and then imaging to the intermediate image plane of the object, and diffracting from a distance to Fresnel diffraction region to generate optical diffraction field, to solve the constrained issue of actual pixel size of the photodetector array.

In one embodiment, the transparent substrate is for example glass substrate, sapphire substrate, transparent ceramic substrate, transparent polymer substrate, such as polycarbonate (PC) substrate, Polymethylmethacrylate (PMMA) substrate or high transmittance optical substrate. In addition, Polyester (PET) film or other transparent film can also be used as test target for defect image.

Figure 4:
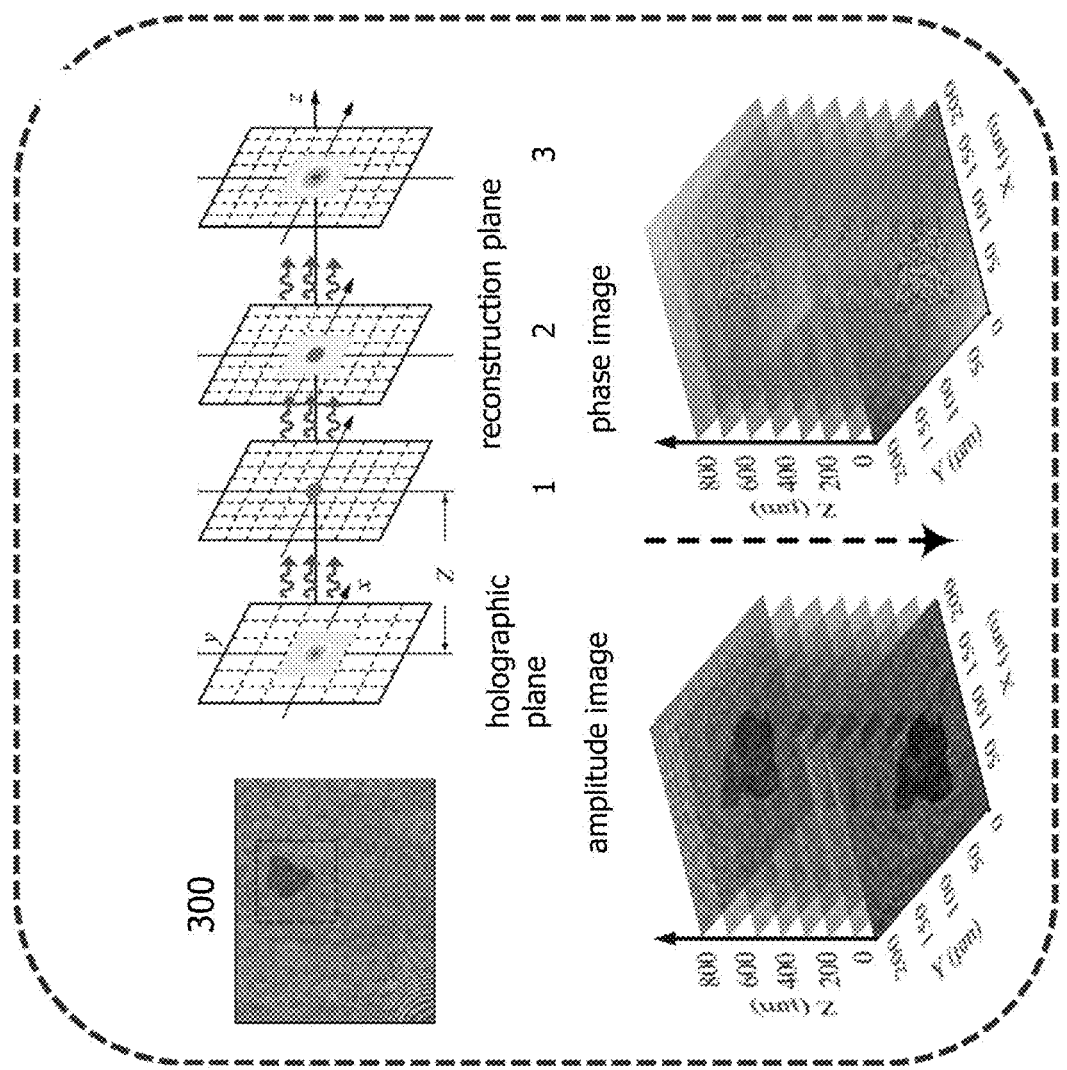
FIG. 4 illustrates the variation of defect diffraction images of the amplitude and phase images of the digital hologram in a holographic plane and different reconstruction planes.

The reference wave includes: plane wave, spherical wave or arbitrary curved surface wave. In one embodiment, the spherical reference wave is magnified by encoding spherical factor to reduce spectrum bandwidth of the measured object in the Fourier plane, in order to avoid spectrum overlap between the object spectrum and DC term or conjugate term, and the effective number of pixels can retrieve and record high frequency information of the object to be measured. Accordingly, the optimal lateral resolution and field of view of the wide field digital holography is obtained by optimizing the object distance and the spherical reference wave (light). The above-mentioned wide field digital holography may be used to complete wavefront recording and reconstruction, in order to obtain the defect complex images of the object to be measured. The reconstructed defect complex images include amplitude images and phase images, as shown in FIG. 4.

The digital hologram is performed by an up-sampling technology to enhance the equivalent resolution of the photodetector array of the optical system, further to achieve wide field, high resolution imaging effect. The reconstruction method of digital hologram includes Fourier transform approach, convolution approach, angular spectrum approach or Fresnel diffraction transform approach to reconstruct the object diffraction wave of the transparent substrate. In the numerical reconstruction method of Fourier transform approach, the number of pixels will be changed with the reconstruction distance. This feature will make pixel size reduction of the reconstructed image, in order to avoid the actual pixel size of the photodetector array to be restricted, and to achieve the purpose of up sampling the reconstructed image.

Figure 5:
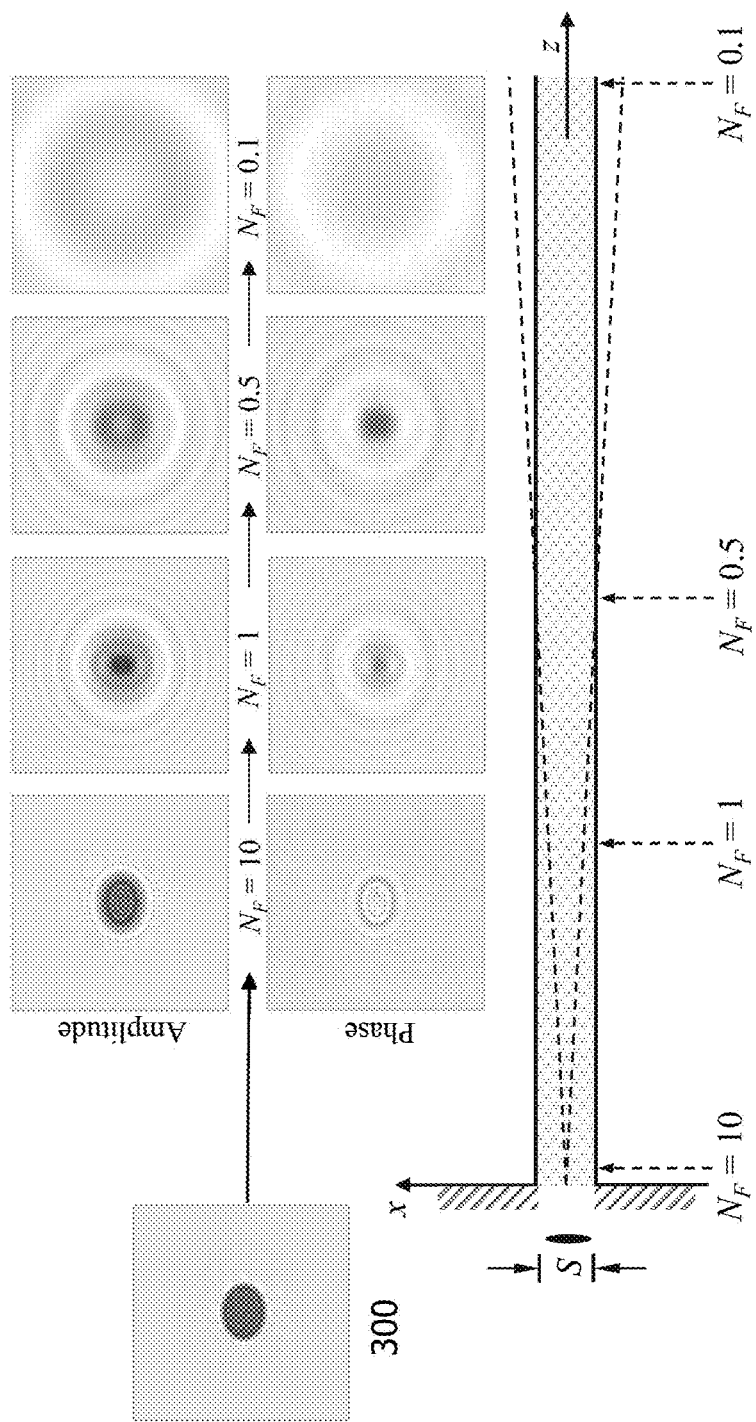
FIG. 5 illustrates a schematic diagram of Fresnel diffraction passing through the defect with a width of S, and the reconstruction of simulated complex images with different Fresnel values.
Figure 6:
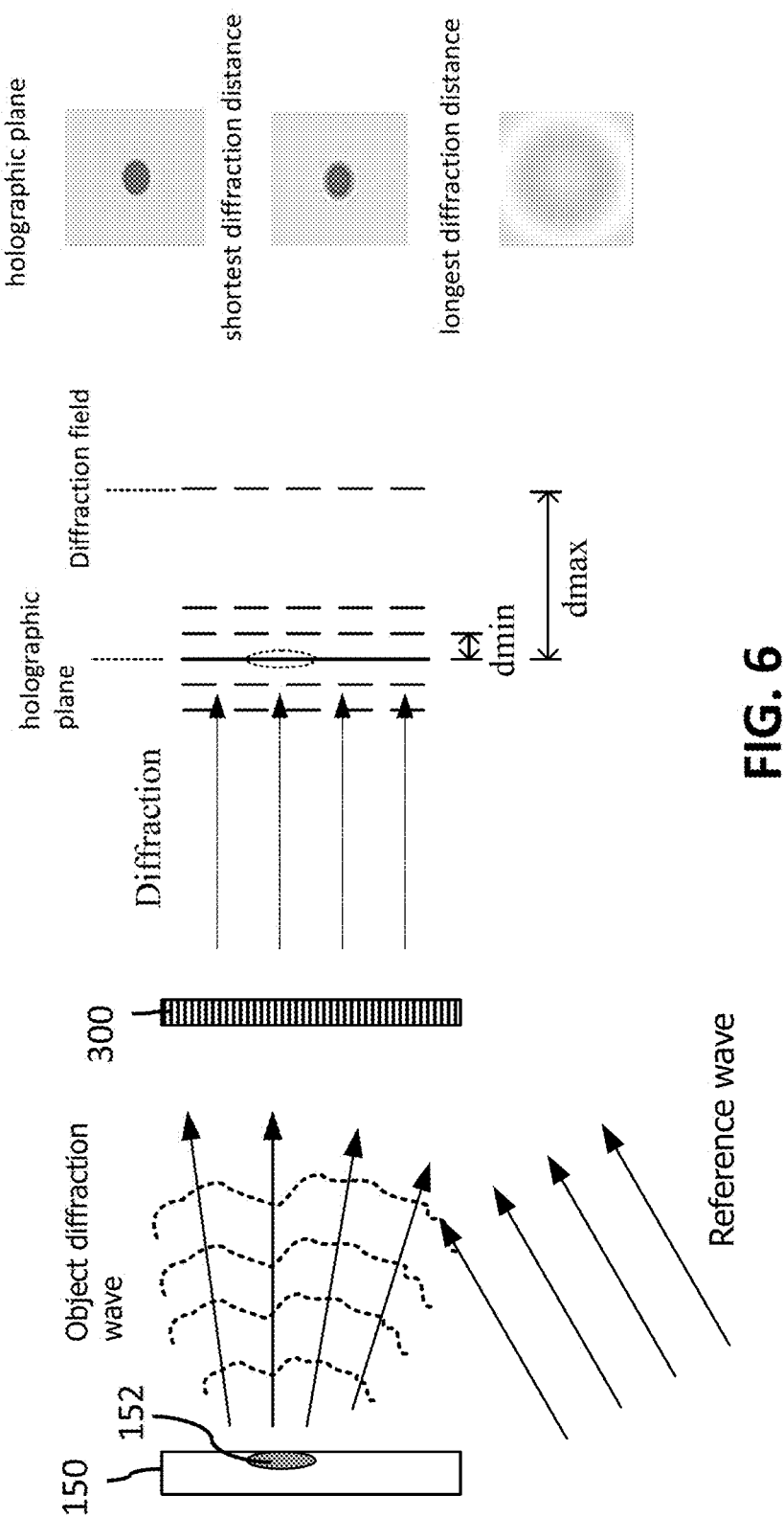
FIG. 6 illustrates the diffraction model of the defect.

As mentioned above, penetrating/reflecting light field of the defect is diffracted to the image sensor and interfered with the reference light, and then recorded as a digital hologram 300. The defect light field of the recorded digital hologram 300 is obtained by using the digital reconstruction method (executed in a computer). As shown in FIG. 4 and FIG. 5, it shows the variation of defect diffraction images of the amplitude and phase images of the digital hologram 300 in a holographic plane and different reconstruction planes (reconstruction plane 1, reconstruction plane 2 and reconstruction plane 3). Next, in step 210, the effective diffraction range of the defect complex light field is confirmed by using a complex defect diffraction module. The defect diffraction module can carry out the diffraction propagation of defect complex light field, which includes the shortest diffraction distance (dmin) and the longest diffraction distance (dmax), as shown in FIG. 6. Among them, the shortest diffraction distance (dmin) and the longest diffraction distance (dmax) are expressed as the following formulas: $dmin=2\lambda z_I^2/L_x^2$, $dmax=S^2/4\lambda N_F$, where $\lambda$ (lambda) is the wavelength of incident light, $z_I$ is the reconstruction distance of imaging plane, $L_x$ is the size of complex defect diffraction (CCD) on X axis, S is the size of defect, and $N_F$ is the Fresnel number.

The thickness of the transparent substrate is between the shortest diffraction distance (dmin) and the longest diffraction distance (dmax).

Through the defect diffraction module, the image plane of the defect complex light field diffraction can be calculated. In this embodiment, the defect diffraction module is used to define the defect to be identified, the effective diffraction range required in the identification process, and number of the effective diffraction within the effective diffraction range can be observed and discussed. FIG. 5 shows a schematic diagram of Fresnel diffraction passing through the defect 152 with a width of S, and the reconstruction of simulated complex images with different Fresnel values ($N_F$=10, 1, 0.5, 0.1). As shown in FIG. 5, according to the complex defect diffraction module of the present invention, the range of longitudinal effective diffraction characteristics analysis is defined, including effective reconstruction interval and the longest distance; the diffraction characteristics recorded by different reconstruction distances can be seen through the simulation of phantom diffraction. In actual holographic shooting, the complex defect diffraction module can record the diffraction characteristics of different longitudinal positions for different defects (watermark, scratch, dust, etc.).

FIG. 6 shows that the reconstructed complex light field of the defect 152 is numerically diffracted to different distances to obtain the different distribution of the diffraction field (including the imaging plane) of the defect. In this diffraction model, the shortest and longest diffraction distances of two adjacent diffraction planes can be determined. Under the condition of minimum effective reconstruction interval (separation) and maximum diffraction distance (acceptable diffraction distance in the effective regime), the difference of light field between two diffraction planes is not obvious. In the case of the longest diffraction distance, the light field will not change significantly due to the far-field diffraction. Under the definition of minimum effective reconstruction interval and maximum diffraction distance, the complex images generated by the defect through diffraction propagating at different longitudinal positions can be obtained by numerical reconstruction, and the defect complex image database required by machine learning or deep learning algorithms can be expanded by data augmentation.

Figure 7:
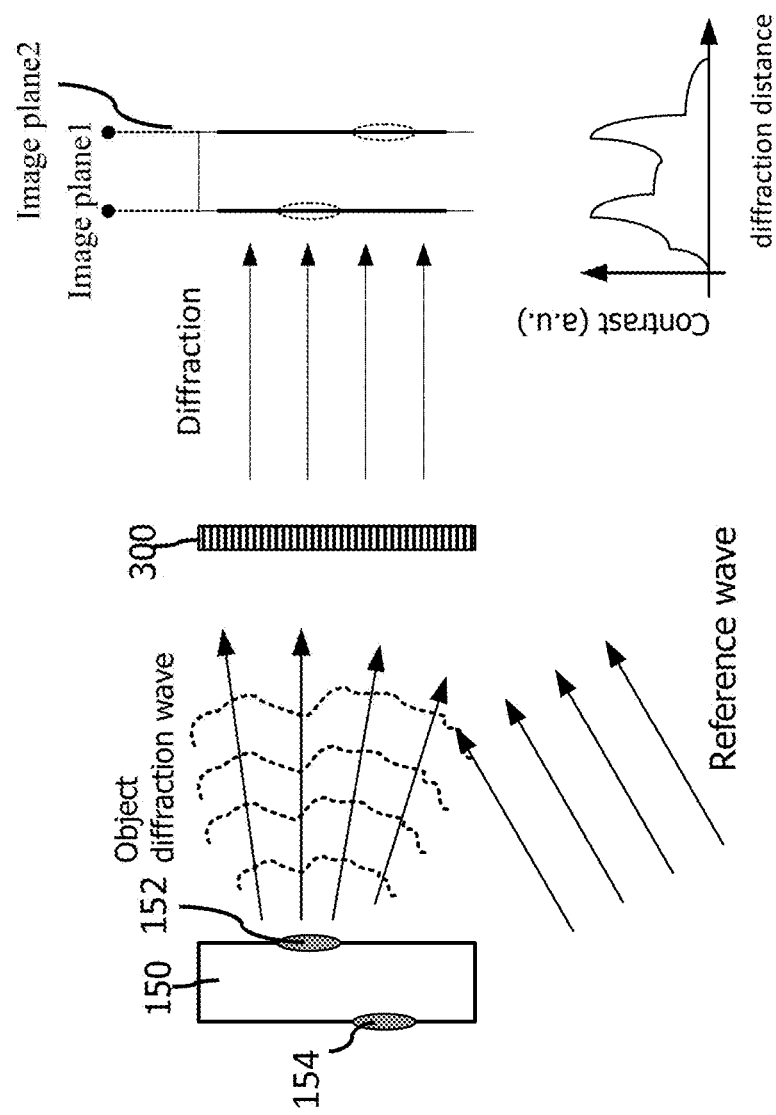
FIG. 7 illustrates the position of the defect.

Next, in step 220, a defect inspection module is used to detect a location of the defect on the glass substrate. In this step, a defect inspection algorithm based on the diffraction characteristics is used, which automatically detects the location of the defect on the glass substrate in the above-mentioned defect diffraction module. In an embodiment, an automatically focusing (auto-focusing) algorithm is used to determine whether a defect image is formed or not, and then the defect location on the substrate can be determined by the defect imaging position. As shown in FIG. 7, the penetrating/reflecting light field of the glass substrate 150 is diffracted to the image sensor and recorded as a digital hologram 300 by interfered with the reference light. The digital hologram reconstructed by a computer acquires the recorded penetrating/reflecting light field, and the reconstructed penetrating/reflecting numerical light field is diffracted to the imaging plane. The automatically focusing algorithm is used to determine whether there is a defect imaging on the position of the substrate. The imaging characteristics can be used to detect the location of defect on the substrate sample. FIG. 7 shows that light field diffraction have higher contrast values at the image plane 1 and the image plane 2 to determine the position of the defects 152 and 154 on the substrate 150.

Then, in the step 230, a defect classification module is used to extract, analyze and classify the diffraction characteristics of the defect complex light field. Through the above defect diffraction module, the defect diffraction light field of a transparent substrate with known defect location can be calculated. In this step, a defect identification algorithm based on the diffraction characteristics is used to extract and analyze the diffraction characteristics of the detected defect regions in the above defect diffraction module.

Finally, in the step 240, a machine learning algorithm is used to analyze and judge the diffraction light field characteristics of a defect at a known location, so as to automatically classify the type of the defect. For example, a classifier is used to automatically identify the type of the defect.

Figure 8:
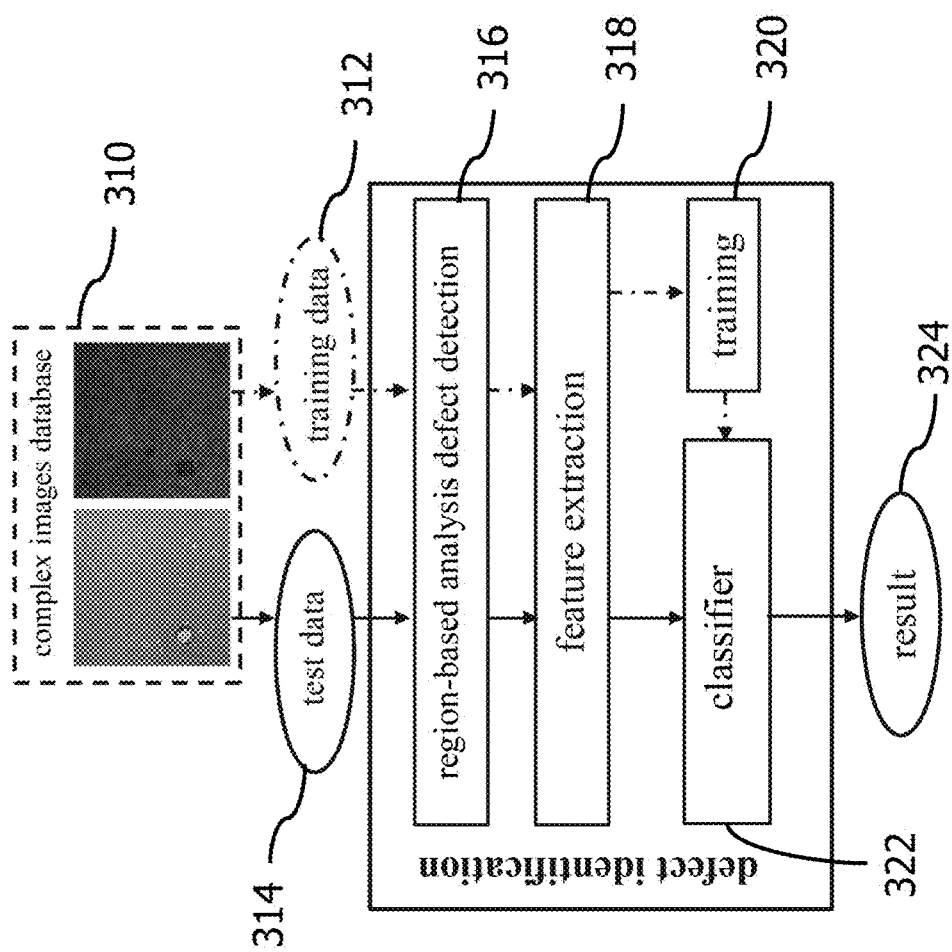
FIG. 8 illustrates a process flow of defect identification for machine learning algorithm based on diffraction characteristics.
Figure 9:
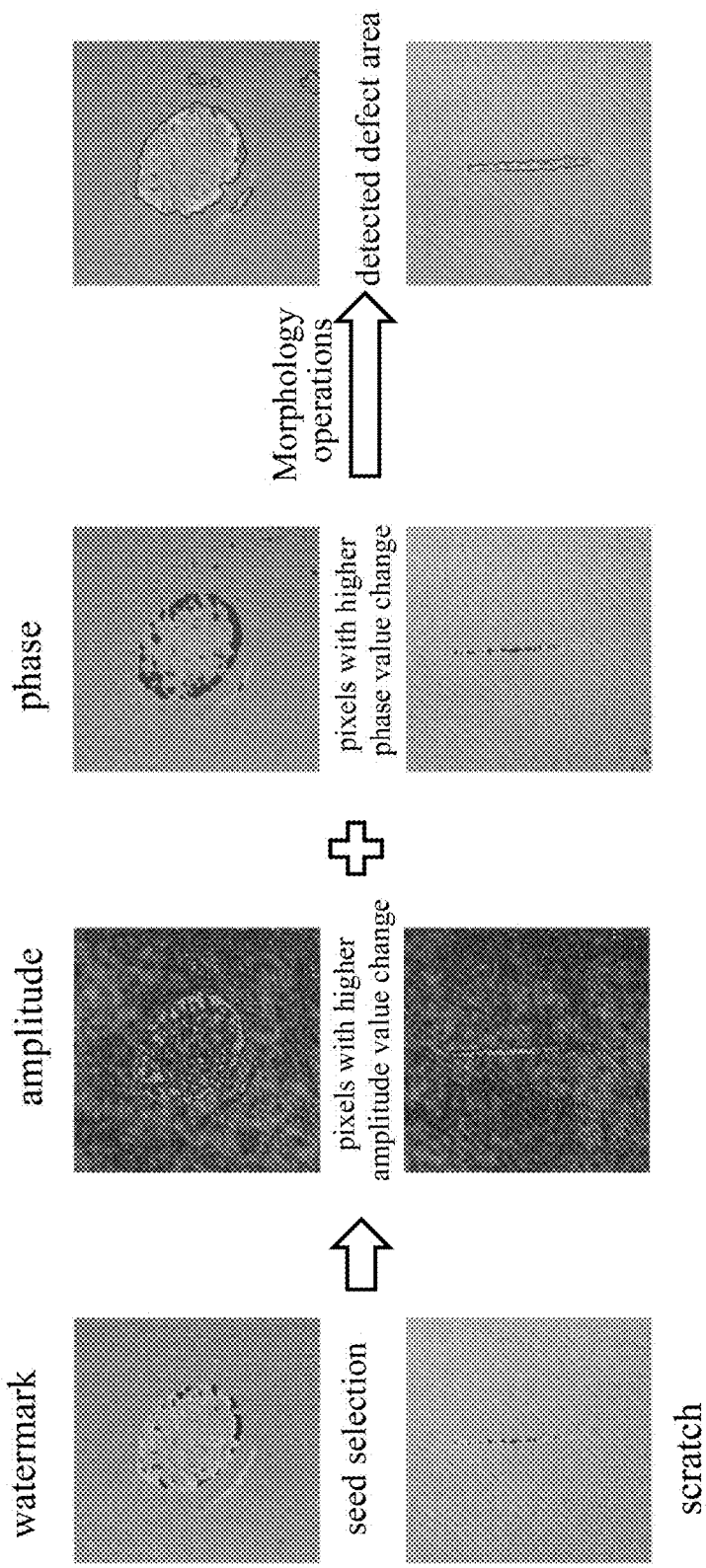
FIG. 9 illustrates a process flow of defect identification for machine learning algorithm.

As shown in FIG. 8, it shows the process flow of defect identification for machine learning algorithm based on diffraction characteristics. The defect complex images database 310 provides images data required for training data 312 and test data 314. Then, the training data 312 and the test data 314 are performed by a defect identification process. The process is performing a region-based analysis defect detection 316, such as using a region-based segmentation algorithm and morphological operators to perform subsequent image processing; the seed selection part is related to the pixels of phase change on the Z axis in the phase image, and the part of region segmentation is considered: the pixels with higher amplitude value change on the Z axis in the amplitude image, and the pixels with higher phase value change on the Z axis in the phase image. As shown in FIG. 9, the seed selection includes watermark and scratch or crack, in which pixels with larger amplitude and phase changes are combined to obtain detected defect area through a morphological operation method. As shown in FIG. 9, the region growing segmentation is used to detect regions with high pixels value change, and an autofocusing is performed to remove regions that are not imaged in the middle image plane.

Figures 10A, 10B, 10C:
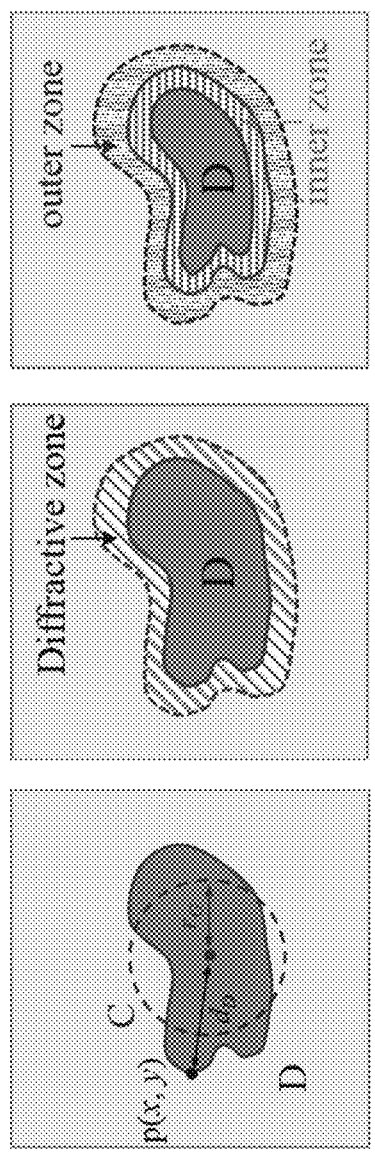
FIG. 10A to FIG. 10C illustrates quantitative features of the complex images.

After that, the step of feature extraction 318 is performed. In this step, a set of quantitative features is included to analyze the diffraction characteristics of the defect complex images in the defect detection area. In one embodiment, the quantitative features of the complex images comprise one pattern feature and seven optical diffraction features, which are circle index, margin diffraction, margin sharpness, maximal value mean, minimal value mean, maximal value variation, minimal value variation and area ratio. As shown in FIG. 10A, the circle index takes an appropriate circle C in the detected defect area D, and the point P (x, y) around the area is at a distance from the center of the circle. The margin diffraction is shown in FIG. 10B, which is shown in a diffractive zone outer of the defect detection area D. The margin sharpness, as shown in FIG. 10C, includes both outer zone and inner zone.

Next, after the test data 314 is processed by the defect detection 316 and the feature extraction 318, a classifier 322 is used to perform a multi-class defect classification. After the training data 312 is processed by the defect detection 316 and the feature extraction 318, a training 320 needs to be further performed, and then the classifier 322 is used to perform a multi-class defect classification. For example, a logistic regression model and a k-fold cross validation are used to perform the multi-class defect classification. Finally, the result 324 of classification is obtained.

Figure 11:
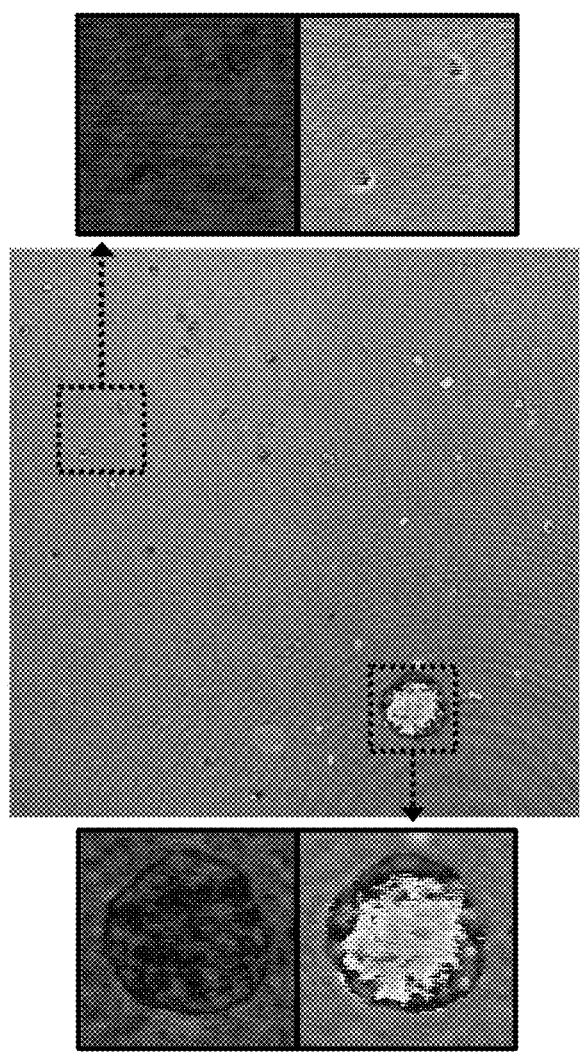
FIG. 11 illustrates the qualitative evaluation of defect detection of test examples with one watermark and several dusts.
Figure 12:
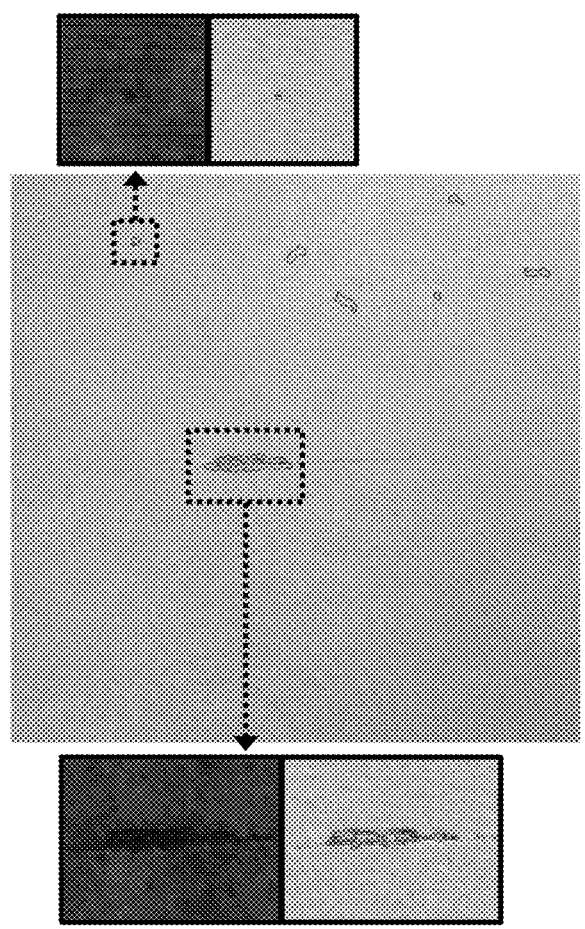
FIG. 12 illustrates the qualitative evaluation of defect detection of test examples with a scratch and several dusts.

By means of complex defect detection of machine learning algorithm, in some experiments of embodiments, there are 268 glass defects on 52 holograms, including 81 watermarks, 119 dusts and 68 cracks. As shown in Table 1 below, it shows a confusion table of defect detection including 268 defects. The effectiveness evaluation of the defect detection includes qualitative evaluation and quantitative evaluation. As shown in FIG. 11, it shows the qualitative evaluation of defect detection of test examples with one watermark and several dusts. As shown in FIG. 12, it shows the qualitative evaluation of defect detection of test examples with a scratch and several dusts. In addition, 268 glass defects are quantitatively evaluated by the proposed complex defect detection system. The detection results include 258 defect areas, i.e. number of 258 True Positive (TP), 29 False Positive (FP) and 10 False Negative (FN). Therefore, the machine learning algorithm for defect detection of the present invention can quantify and analyze the defect diffraction characteristics within the definition of the diffraction module, and the corresponding efficiency analysis can be obtained, in which the detection accuracy is about 96%.

TABLE 1

|  | Total number | TP | FP | FN |
|---|---|---|---|---|
| Defects | 268 | 258 | 29 | 10 |
| watermark | 81 | 75 | — | 6 |
| dust | 119 | 117 | — | 2 |
| scratch | 68 | 66 | — | 2 |

Figure 13:
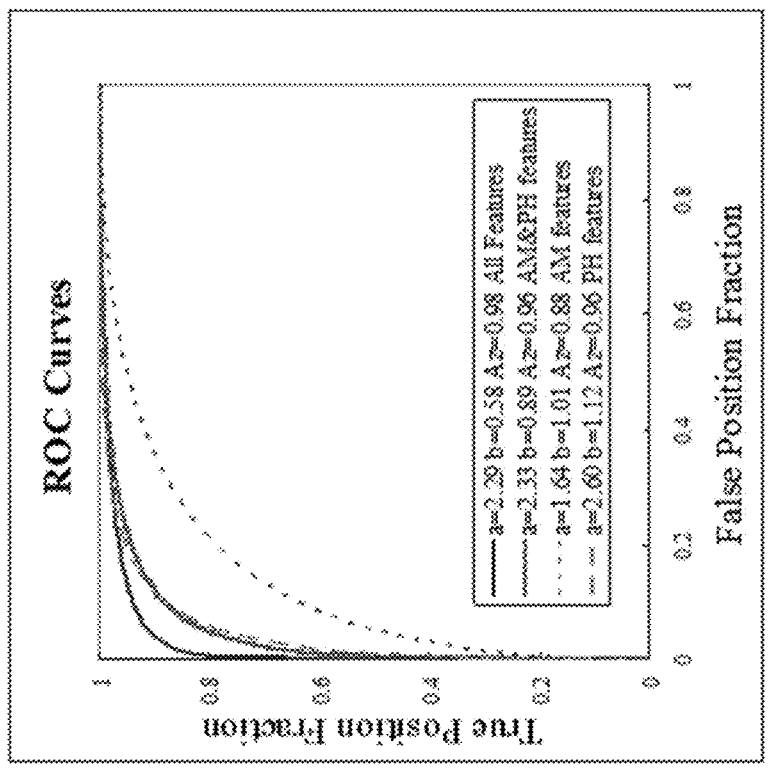
FIG. 13 illustrates a receiver operating characteristic (ROC) curve of the machine learning algorithm.

In addition, according to quantitative characteristics, the overall effectiveness evaluation of multi-class defect classification is compared, as described in Table 2, where PPV means a Positive Predictive Value and NPV means a Negative Predictive Value. The receiver operating characteristic (ROC) curve is described in FIG. 13. The aforementioned classification model (classifier) is the process of mapping an instance to a specific class. The ROC is analyzed by a binary classification model, which means that the output results are only two types of model.

TABLE 2

|  | All features | Optical Diffraction Characteristics - complex images | Optical Diffraction Characteristics - amplitude images | Optical Diffraction Characteristics - phase images |
|---|---|---|---|---|
| Accuracy | 97.7% | 95.3% | 83.3% | 94.2% |
| Sensitivity | 94.3% | 93.8% | 82.6% | 91.4% |
| Specificity | 97.1% | 96.5% | 89.8% | 94.6% |
| PPV | 95.1% | 93.8% | 80.4% | 92.3% |
| NPV | 97.2% | 94.3% | 88.6% | 93.7% |
| Az | 0.98% | 0.96 | 0.88 | 0.96 |

In another embodiment, a deep learning algorithm is used to analyze and determine the diffraction light field characteristics of a defect at known location in order to automatically classify the type of the defect.

Figure 14:
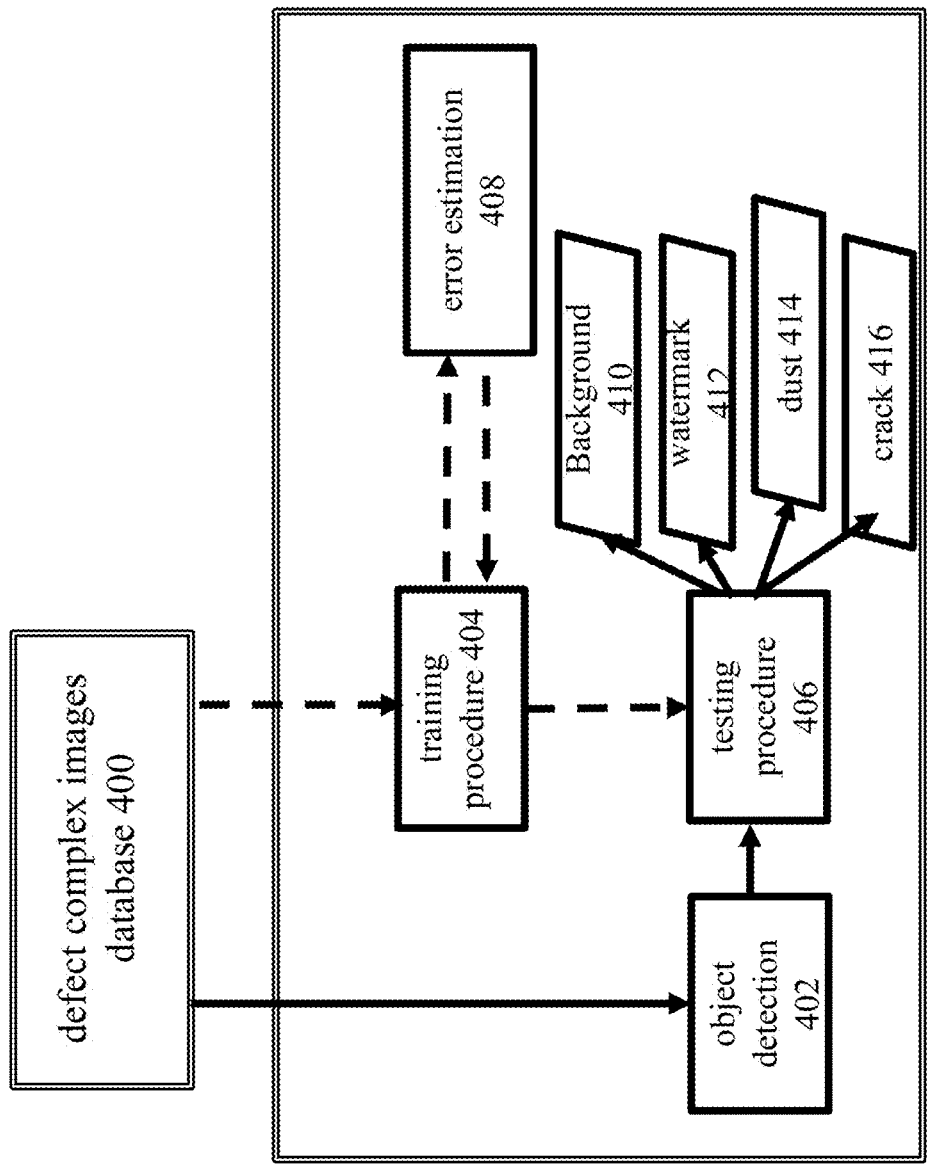
FIG. 14 illustrates the process flow of defect identification of the deep learning algorithm based on the diffraction characteristics.

As shown in FIG. 14, it shows the process flow of defect identification of the deep learning algorithm based on the diffraction characteristics. Firstly, a defect complex image database 400 is provided, which includes a data set of defect complex images obtained in the step 200 of FIG. 3, including amplitude images and phase images. Utilizing the defect detection apparatus of a transparent substrate, the characteristics of all kinds of defect complex images are established as a defect complex images database for feature classification and screening, which is stored in an image database. The identification and classification of the defect complex images can be performed by a classification unit of defect complex image.

In one embodiment, a defect inspection method for the transparent substrate further includes a process of utilizing defect diffraction module to obtain complex images of defects in the minimal and the maximal diffraction distances of diffraction propagation, and to reach data augmentation of the defect complex image database required for machine learning or depth learning algorithm.

Figure 15:
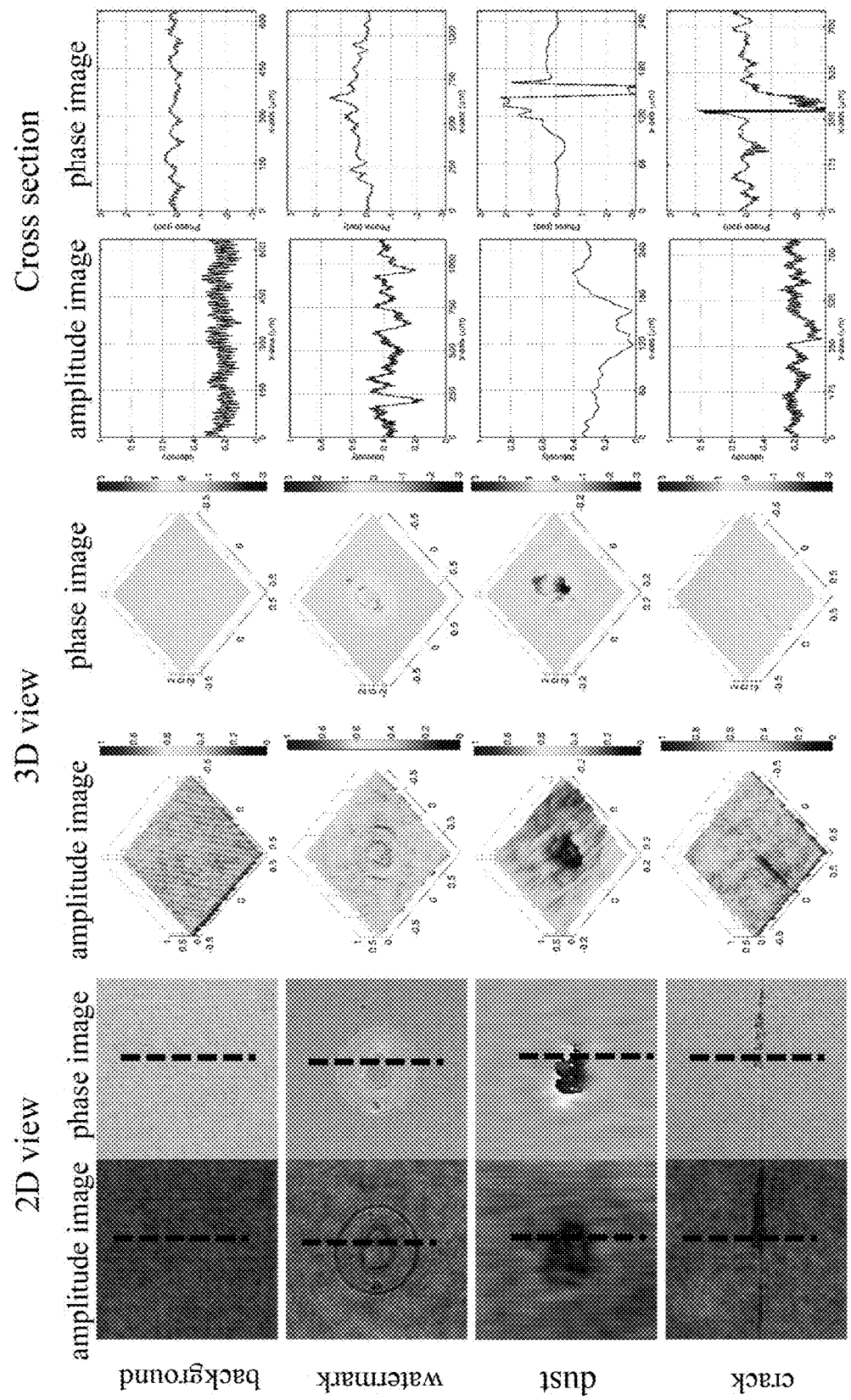
FIG. 15 illustrates the defect complex images and test wavefrom of the deep learning algorithm.
Figure 16:
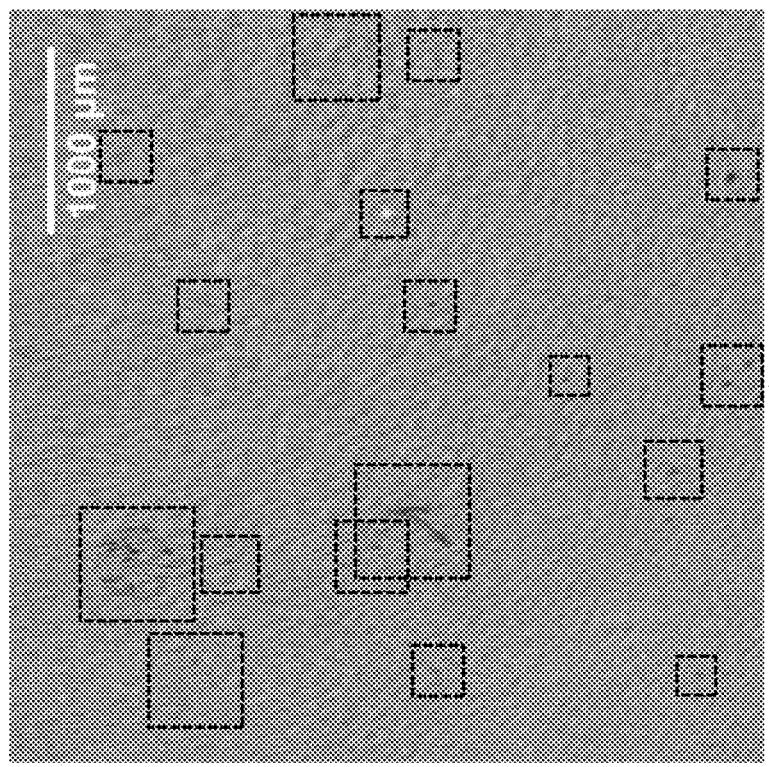
FIG. 16 illustrates the areas of relevant pixel value changes of the object detection.
Figure 17:
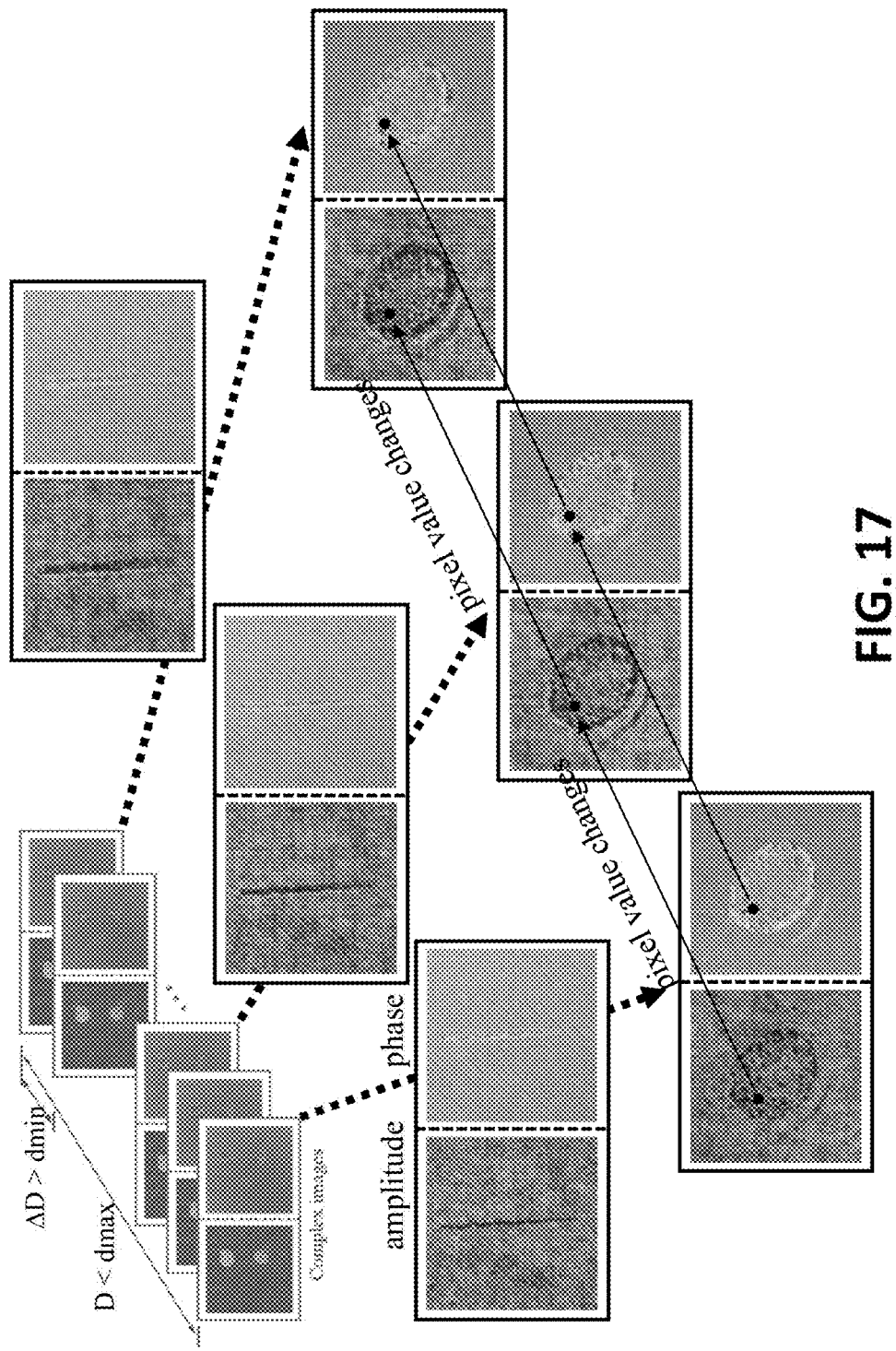
FIG. 17 illustrates the relevant pixel value changes of the object detection.
Figure 18:
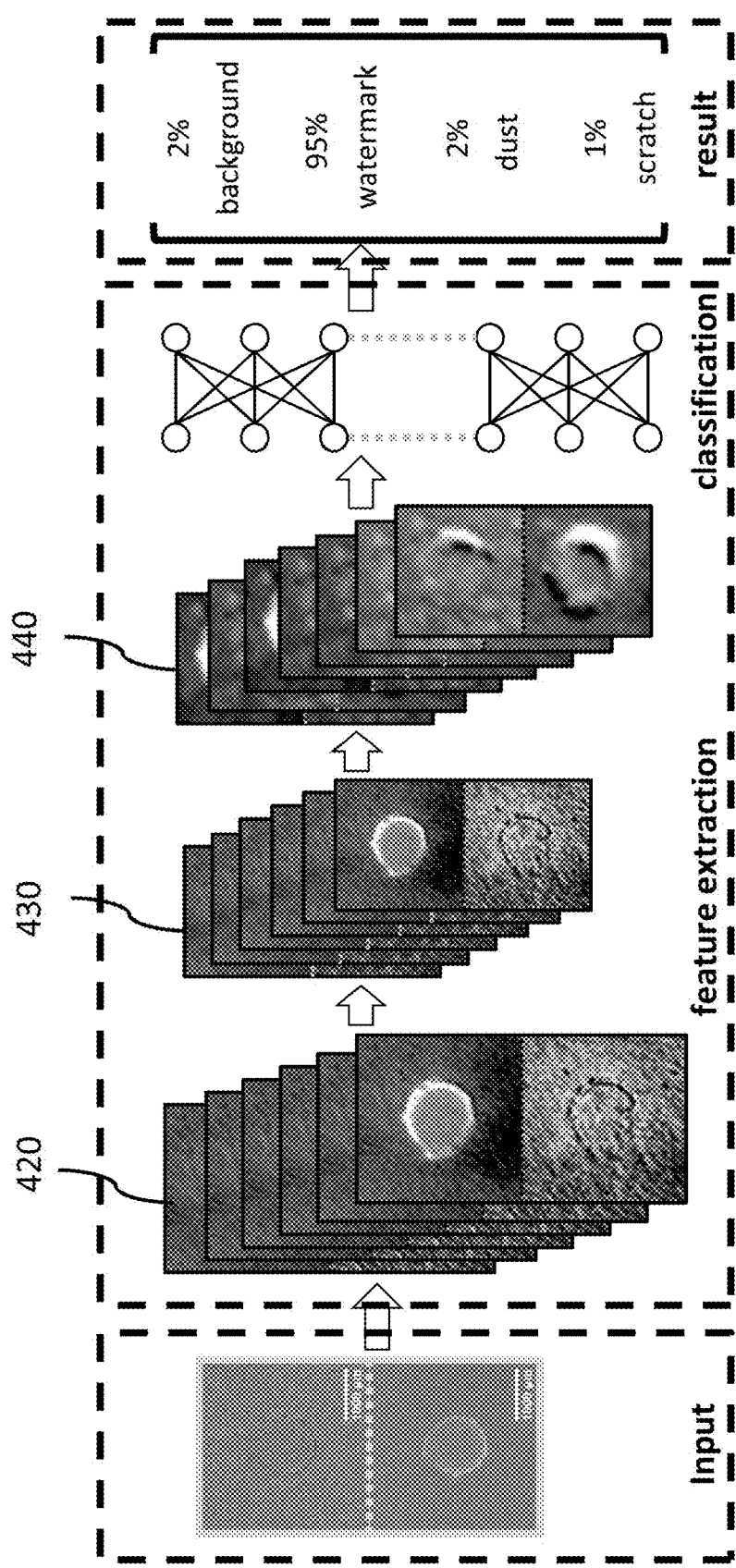
FIG. 18 illustrates the defect region detected by the object detection is analyzed by using at least one convolutional neural network method.

The data in database 400 is passed through a training procedure 404, during which an error estimation 408 is performed. The result of the error estimation is sent back to the training procedure 404 for reference, and then a testing procedure 406 is executed for defect identification. The results include the amplitude images and phase images of background 410, watermark 412, dust 414 and crack 416, as shown in FIG. 15. In addition, the data in the database 400 is detected by an object detection 402, and then the testing procedure 406 is executed to identify the defects and automatically find the object in the image. The object detection 402 is used to detect areas of relevant pixel value change, such as those shown in the box in FIG. 16, and the pixel value changes are referred to FIG. 17. The region detected by the object detection is analyzed by using at least one convolutional neural network method, such as the schematic diagram of FIG. 18; a defect complex image is input, and followed by performing a feature extraction procedure including three steps: first, a feature pattern is generated after a convolution procedure 420, then dimension is reduced after a pooling procedure 430, and then another convolution process is performed to form feature pattern 440; and then a classification procedure is performed. The results are 2% background, 95% watermark, 2% dust and 1% scratch.

Figure 19:
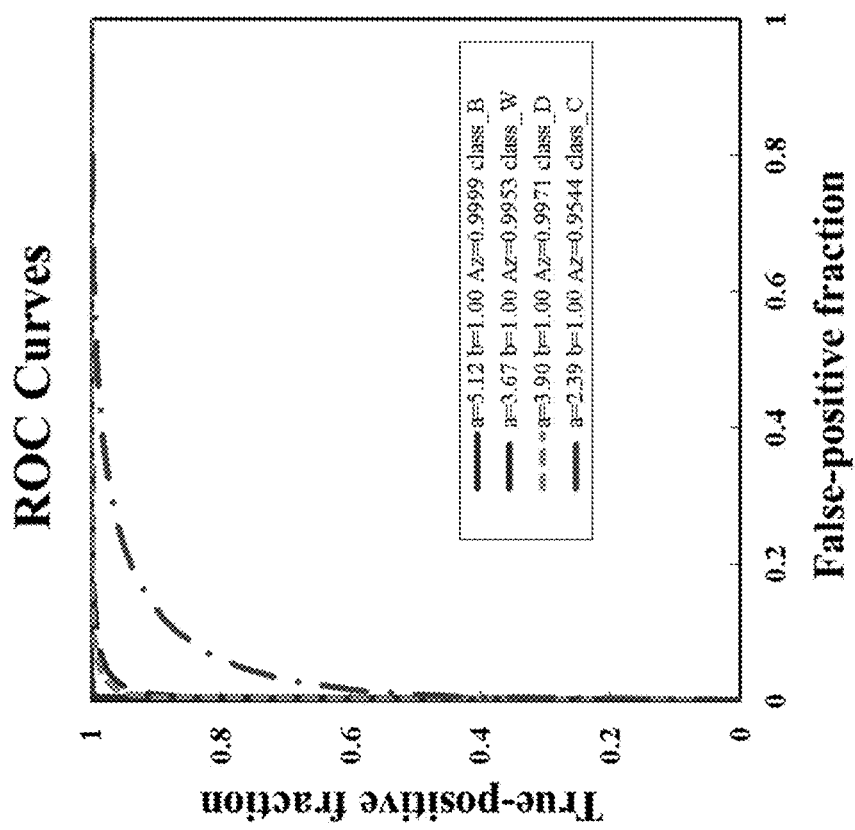
FIG. 19 illustrates a receiver operating characteristic (ROC) curve of the deep learning algorithm.

The experimental results of defect complex image detection in deep learning are described in Table 3, which includes classification of predictive results, in which TP means True Positive, FP means False Positive, FN means False Negative and TN means True Negative. As can be seen from Table 3, TP and TN occupied a large proportion. The results show that the accuracy (correct) rate of the defect detection and classification is about 99%, please refer to Table 4. The receiver operating characteristic (ROC) curve is described in FIG. 19.

TABLE 3

|  | background | watermark | dust | scratch |
|---|---|---|---|---|
| TP | 551 | 134 | 318 | 102 |
| FP | 6 | 6 | 7 | 4 |
| FN | 3 | 3 | 11 | 13 |
| TN | 575 | 992 | 799 | 1016 |

TABLE 4

|  | background | watermark | dust | scratch |
|---|---|---|---|---|
| Accuracy | 99.2% | 99.2% | 98.4% | 98.5% |
| Sensitivity | 99.4% | 97.8% | 96.6% | 88.7% |
| Specificity | 98.9% | 99.4% | 99.1% | 99.6% |
| PPV | 98.9% | 95.7% | 97.9% | 96.2% |
| NPV | 99.5% | 99.7% | 98.6% | 98.7% |
| Az | 0.99 | 0.99 | 0.99 | 0.95 |

The algorithms of the steps of 200-240 of FIG. 3, machine learning, deep learning of the mentioned above can be executed by operation of computer. The experimental results show that the apparatus and method of digital hologram of the invention can successfully detect various defects on the transparent substrate, such as scratch, watermark and dust, and achieve the accuracy rate of detection and classification 96% and 97% respectively, even higher accuracy.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A method for defect inspection of a transparent substrate, which is executed by a computer, the method comprising:
   using the computer to perform the following:
      utilizing a wavefront reconstruction unit to reconstruct a wide-field hologram image of a transparent substrate created by a digital holographic microscopy to obtain defect complex images including an amplitude image and a phase image of a defect of said transparent substrate;
      utilizing a defect diffraction module to confirm an effective diffraction range of said defect complex image, determine a difference of diffraction field of said defect at different diffraction planes through a longitudinal focal depth of said diffraction field to define a number of effective observations within said effective diffraction range and record diffraction characteristics of said defect complex images by simulating of phantom diffraction at different reconstruction distances, wherein said effective diffraction range includes a minimum diffraction distance and a maximum diffraction distance;
      utilizing a defect inspection module to determine a location of a defect on said transparent substrate by determining a contrast value of reconstructed penetrating and reflecting numerical light field of said defect complex images diffracted to an imaging plane; and
      utilizing a defect classification module to classify a type of said defect by a defect identification algorithm based on said diffraction characteristics of said defect complex images.

2. The method of claim 1, wherein said minimum diffraction distance is equal to $2\lambda r^2/L_x^2$ and said maximum diffraction distance is equal to $S^2/4\lambda N_F$, where $\lambda$ is a wavelength of incident light, $z_1$ is a reconstruction distance of an imaging plane, $L_x$ is a size of complex defect diffraction on X axis, S is a size of defect, and $N_F$ is a Fresnel number.

3. The method of claim 2, wherein said transparent substrate is a glass substrate.

4. The method of claim 3, wherein said transparent substrate is a sapphire substrate.

5. The method of claim 2, wherein said transparent substrate is a transparent ceramic substrate, transparent polymer substrate or high transmittance optical substrate.

6. The method of claim 1, further comprising a numerical propagation of Fourier transform approach, convolution approach, angular spectrum approach or Fresnel diffraction transform approach to reconstruct object diffraction wave of said transparent substrate to obtain said defect complex images.

7. The method of claim 1, wherein said transparent substrate includes a Polyester (PET) film.

8. The method of claim 7, wherein said transparent substrate includes a transparent film.

9. The method of claim 1, further comprising a machine learning algorithm to analyze and judge diffraction light field characteristics of said defect at said location to identify said defect.

10. The method of claim 9, wherein said machine learning algorithm is performed in said defect classification module.

11. The method of claim 9, wherein said machine learning algorithm includes a region-based segmentation algorithm and morphological operators.

12. The method of claim 9, wherein said machine learning algorithm includes a feature extraction process and a classification model.

13. The method of claim 9, further comprising providing a defect complex images database for said machine learning algorithm.

14. The method of claim 9, wherein said machine learning algorithm includes at least one convolutional neural network and at least one classifier.

15. The method of claim 1, further comprising a deep learning algorithm to analyze and judge diffraction light field characteristics of said defect at said location to identify said defect.

16. The method of claim 15, wherein said deep learning algorithm is performed in said defect classification module.

17. The method of claim 1, wherein said transparent substrate is a glass substrate, sapphire substrate, transparent ceramic substrate, transparent polymer substrate or high transmittance optical substrate.

18. The method of claim 1, wherein said transparent substrate includes a Polyester (PET) film or a transparent film.

* * * * *